(12) United States Patent
Sizer et al.

(10) Patent No.: US 11,115,303 B2
(45) Date of Patent: Sep. 7, 2021

(54) NETWORK CONNECTABLE DEVICE AND A METHOD FOR MONITORING A SERVICE-STATE OF A NETWORK CONNECTED DEVICE

(71) Applicant: GENESYS ELECTRONICS DESIGN PTY LTD, Pymble (AU)

(72) Inventors: Geoffrey Sizer, Turramurra (AU); Jonathan Eggins, Macquarie Park (AU)

(73) Assignee: GENESYS ELECTRONICS DESIGN PTY LTD, Pymble (AU)

( * ) Notice: Subject to any disclaimer, the term of this patent is extended or adjusted under 35 U.S.C. 154(b) by 0 days.

(21) Appl. No.: 16/302,549

(22) PCT Filed: Feb. 16, 2017

(86) PCT No.: PCT/AU2017/050134
§ 371 (c)(1),
(2) Date: Nov. 16, 2018

(87) PCT Pub. No.: WO2017/197441
PCT Pub. Date: Nov. 23, 2017

(65) Prior Publication Data
US 2019/0280952 A1    Sep. 12, 2019

(30) Foreign Application Priority Data
May 19, 2016 (AU) .................. 2016901875

(51) Int. Cl.
*H04W 4/70* (2018.01)
*H04L 12/26* (2006.01)

(52) U.S. Cl.
CPC ........ *H04L 43/0817* (2013.01); *H04L 43/065* (2013.01); *H04L 43/0829* (2013.01)

(58) Field of Classification Search
CPC ............... H04L 43/065; H04L 43/0817; H04L 43/0876; H04L 67/10; H04L 67/12;
(Continued)

(56) References Cited

U.S. PATENT DOCUMENTS 6,658,585 B1  12/2003  Levi
8,595,346 B2 *  11/2013  Bairavasundaram ....................
  G06F 9/5011
  709/223

(Continued)

FOREIGN PATENT DOCUMENTS

WO    WO 2013/071949 A1    5/2013
WO    WO 2015/174916 A1    11/2015

OTHER PUBLICATIONS

Sheng, Zhengguo, et al., "Recent Advances in Industrial Wireless Sensor Networks Toward Efficient Management in IoT," *IEEE Internet of Things Journal*, vol. 2, No. 5, pp. 402-411 (Oct. 2015).

(Continued)

*Primary Examiner* — Phuc H Tran
(74) *Attorney, Agent, or Firm* — Christensen, Fonder, Dardi & Herbert PLLC

(57) ABSTRACT

A network connectable device that is configured to send to a service-state monitor via a network connection service-monitoring protocol information that defines at least one operational parameter for a service-monitoring protocol that comprises sending to the service-state monitor a plurality of service-state messages that each indicate a service-state of the network connectable device when so sent. The network connectable device is configured to send to the service-state monitor via the network connection the plurality of service-state messages.

19 Claims, 6 Drawing Sheets

(58) Field of Classification Search
CPC ........ H04L 67/125; H04L 67/26; H04W 4/38; H04W 4/50; H04W 4/70
See application file for complete search history.

(56) References Cited

U.S. PATENT DOCUMENTS

| | | | |
|---|---|---|---|
| 2014/0223014 A1* | 8/2014 | Bairavasundaram | H04L 67/1097 709/226 |
| 2015/0067154 A1* | 3/2015 | Ly | H04L 43/0876 709/224 |
| 2016/0119740 A1* | 4/2016 | Tsiatsis | H04L 67/1002 370/329 |
| 2017/0187588 A1* | 6/2017 | Nolan | H04W 4/70 |

OTHER PUBLICATIONS

Mazhelis, Oleksiy, et al., "Retrieving Monitoring and Accounting Information From Constrained Devices in Internet-of-Things Applications," *IFIP International Conference on Autonomous Infrastructure, Management and Security; AIMS 2013: Emerging Management Mechanisms for the Future Internet*, vol. 7943, pp. 136-147 (2013).

Datta, Soumya Kanti et al, "A Lightweight Framework for Efficient M2M Device Management in oneM2M Architecture," *2015 International Conference on Recent Advances in Internet of Things (RIoT)*, 7 pgs. (Apr. 2015).

Kovatsch, Matthias, et al., "Californium: Scalable Cloud Services for the Internet of Things through CoAP," *2014 International Conference on the Internet of Things (IOT)*, 6 pgs. (2014).

Corici, Andreea Ancuta, et al., "A Solution for Provisioning Reliable M2M Infrastructure using SDN and Device Management," *2015 3$^{rd}$ International Conference on Information and Communication Technology (ICoICT)*, pp. 81-86 (2015).

Zhou, Sen, et al., "Device Clustering for Fault Monitoring in Internet of Things Systems," *2015 IEEE 2$^{nd}$ World Forum on Internet of Things (WF-IoT)*, 6 pgs. (2015).

\* cited by examiner

NETWORK CONNECTABLE DEVICE AND A METHOD FOR MONITORING A SERVICE-STATE OF A NETWORK CONNECTED DEVICE

The present application is a National Phase entry of PCT Application No. PCT/AU2017/050134, filed Feb. 16, 2017, which claims the benefit of Australian Patent Application No. 2016901875, filed May 19, 2016, which are incorporated herein by reference.

TECHNICAL FIELD

The disclosure herein generally relates to a network connectable device and a method for monitoring a service-state of a network connected device.

BACKGROUND

Advances in microcontroller technology and data communications systems are enabling an increasing number of deployed intelligent devices to connect to networks. This has given rise to the concept of the "Internet of Things", which encompasses the interconnection via the Internet of a wide range of devices to control and monitoring systems, and to each other. The term "machine to machine communications" describes a similar concept within the context of industrial, commercial and business applications. The upgrade of internet communications from IPV4 to IPV6 with its vastly increased addressing capacity means that every device ever produced for an indefinite period into the future can have its own universally unique IPV6 address, allowing it to be identified as a part of a contiguous network of devices.

The Internet of Things is enabling the deployment of sensing and control networks across a wide range of industry sectors. This includes environmental monitoring, agriculture, e-health, intelligent transport systems, infrastructure monitoring, smart homes & offices, utilities and many other applications where the ability to communicate with deployed devices adds value.

As the number of devices connected to networks increases, determining their operational state for service reliability is becoming increasingly difficult. As of 2016, more than 6 billion devices were connected to the Internet. By 2020 more than 20 billion devices are expected to be connected to the Internet. The vast number of networked devices precludes manual checking of the service they provide. Determining the operational state of a networked device may be critical, in particular for devices associated with safety systems, life-critical systems, military systems, and high-cost infrastructure monitoring and control systems.

SUMMARY

Disclosed herein is a network connectable device. The network connectable device is configured to send to a service-state monitor via a network connection service-monitoring protocol information that defines at least one operational parameter for a service-monitoring protocol that comprises sending to the service-state monitor a plurality of service-state messages that indicate a service-state of the network connectable device. The network connectable device is configured to send to the service-state monitor via the network connection the plurality of service-state messages.

Embodiments may facilitate the monitoring of the service-state of a plurality of network connected devices and the monitoring of the network connection. The service-state monitor may not require prior knowledge of the service-monitoring protocol for the network connectable device. In view of the plurality of network connectable devices available now and particularly in the future, this may simplify the manual establishment and administration of service-monitoring. No central data store of a plurality of service-monitoring protocols for a plurality of network connectable devices may be required, because the information may be provided by each of the plurality of network connectable devices. This may enable the use of a plurality of network connectable devices in safety- and life-critical systems, for example, where service-state information may need to be acquired and acted on rapidly.

In an embodiment, the service-monitoring protocol information is indicative of at least one of the temporal spacing of the plurality of service-state messages and a plurality of information fields common to each of the plurality of service-state messages.

An embodiment comprises memory loaded with information for establishing the network location of the service-state monitor. The memory may be loaded with the network location information indicative of the network location for the service-state monitor. The network location information may comprise at least one of a network protocol address (for example an IP address), a MAC address, and an electronic serial number. The memory may be preloaded with the network location information. The memory may be loaded with the network location information at at least one of the following:
   during manufacture of the network connectable device;
   during commissioning of the network connectable device; and
   at the time the network connectable device is connected to the network for sending the plurality of messages.

An embodiment is configured to generate a registration message comprising the service-monitoring protocol information, and send to the service-state monitor via the network connection the registration message. The registration message may comprise service-monitoring protocol information generated from information loaded in the memory The registration message may comprise at least one of identification information indicative of the identification of the network connectable device and network connectable device type information indicative of the network connectable device type. The identification information for the network connectable device may comprise an identifier uniquely identifying the network connectable device to the service-state monitor. The identifier may comprise at least one of a MAC address, an electronic serial number and a network protocol address. The registration message may comprise service-monitoring protocol interruption reporting instructions.

An embodiment may be configured to send to the service-state monitor via the network connection the registration message. The registration message may be sent when at least one of the network connection is established and the network connectable device is initialised. The registration message may be sent to the service-state monitor via the network connection when at least one of the network connectable device is reconfigured, the network connection performance changes, a network connectable device configuration changes, and a network connectable device characteristic changes.

In an embodiment, the service-monitoring protocol information defines the service-monitoring protocol.

In an embodiment, the service-monitoring protocol information comprises service-monitoring protocol program instructions. The service-monitoring protocol program instructions may be in the form of software. The service-monitoring protocol program instructions may define at least some, or all, of the service-monitoring protocol for execution by the service-state monitor.

An embodiment is configured to send to another service-state monitor other service-state monitoring information defining at least one operational parameter of another service-monitoring protocol that comprises sending another plurality of service-state messages to the other service-state monitor, and sending to the other service-state monitor via the network connection the other plurality of service-state messages.

An embodiment is configured to, if no response is received from the service-state monitor, send to the other service-state monitor the other service-monitoring protocol information.

An embodiment is configured to send an alert if no response to any one of the plurality of service-state messages is received from the service-state monitor.

In an embodiment, each of the plurality of service-state messages is indicative of an impairment state of the network connectable device.

In an embodiment, the network service-monitoring protocol information may be contained in at least one of the plurality of service-state messages.

In an embodiment, the network connection is an internet connection and the network connectable device is an internet connectable device.

In an embodiment, each of the plurality of service-state messages indicate the service state of the network connectable device when so sent.

Disclosed herein is a method for monitoring a service-state of a network connected device. The method comprises the step of sending to a service-state monitor via a network connection service-monitoring protocol information that defines at least one operational parameter for a service-monitoring protocol that comprises sending to the service-state monitor a plurality of service-state messages that indicate a service-state of the network connectable device. The method comprises the step of sending to the service-state monitor via the network connection the plurality of service-state messages.

In an embodiment, the service-monitoring protocol information is indicative of at least one of the temporal spacing of the plurality of service-state messages and a plurality of information fields common to each of the plurality of service-state messages.

An embodiment comprises the step of retrieving from memory information for establishing the network location of the service-state monitor. The memory may be network connected device memory.

An embodiment comprises the step of retrieving from the memory network location information indicative of the network location of the service-state monitor. The network location information may comprise at least one of a network protocol address, a MAC address, and an electronic serial number.

An embodiment comprises the step of preloading the memory with the network location information. The step of preloading the memory with the network location information may comprise the step of loading the memory with the network location of the service-state monitor at at least one of the following:

during manufacture of the network connectable device;
during commissioning of the network connectable device; and
at the time the network connectable device is connected to the network connection for sending the plurality of messages.

An embodiment comprises the steps of:
generating a registration message comprising the service-monitoring protocol information from information loaded in the memory; and
sending to the service-state monitor via the network connection the registration message.

In an embodiment, the registration message comprises at least one of identification information indicative of the identification of the network connectable device and network connectable device type information indicative of the network connectable device type. The identification information for the network connectable device may comprise an identifier uniquely identifying the network connectable device to the service-state monitor. The identifier may comprise at least one of a MAC address, an electronic serial number, and a network protocol address (e.g. an IP address).

In an embodiment, the registration message comprises service-monitoring protocol interruption reporting instructions.

In an embodiment, the step of sending the service-state information comprises sending to the service-state monitor via the network connection the registration message when at least one of a network connection is established and the network connectable device is initialised.

In an embodiment, the step of sending to the service-state monitor via the network connection the registration message comprises sending to the service-state monitor via the network connection the registration message when at least one of the network connectable device is reconfigured, the network connection performance changes, a network connectable device configuration changes, and a network connectable device characteristic changes.

In an embodiment, the service-monitoring protocol information defines the service-monitoring protocol. The service-monitoring protocol information may comprise service-monitoring protocol program instructions. The service-monitoring protocol program instructions may be in the form of software. The service-monitoring protocol program instructions may define at least some, or all, of the service-monitoring protocol for execution by the service-state monitor.

An embodiment comprises sending to another service-state monitor other service-state monitoring information defining at least one operational parameter of another service-monitoring protocol that comprises sending another plurality of service-state messages to the other service-state monitor, and sending to the other service-state monitor via the network connection the other plurality of service-state messages.

In an embodiment, the other service-monitoring protocol information is sent to the other service-state monitor if no response is received from the service-state monitor.

An embodiment comprises the step of sending an alert if no response to any one of the plurality of state messages is received from the service-state monitor.

In an embodiment, each of the plurality of service-state messages is indicative of an impairment state of the network connectable device.

In an embodiment, the network service-monitoring protocol information is contained in at least one of the plurality of service-state messages.

In an embodiment, each of the plurality of service-state messages indicate the service state of the network connectable device when so sent.

Disclosed herein is a service-state monitor. The service-state monitor is configured to receive via a network connection service-state protocol information that defines at least one operational parameter for a service-monitoring protocol that comprises a network connectable device sending to the service-state monitor a plurality of service-state messages that indicate a service-state of the network connectable device. The service-state monitor is configured to receive from the network connected device via the network connection the plurality of service-state messages.

In an embodiment, the service-state monitor is configured to send an alert if the service-state protocol is not complied with.

In an embodiment, the service-state monitor is configured to request from the network-connected device service-state information if the service-state protocol is not complied with.

Disclosed herein is a service-state monitor. The service-state monitor is configured to receive via a network service-state protocol information that defines at least one operational parameter for a service-monitoring protocol that comprises a network connectable device sending to the service-state monitor a plurality of service-state messages that indicate a service-state of the network connectable device. The service-state monitor is configured to receive from the network connectable device via the network the plurality of service-state messages.

In an embodiment, the service-state monitor is configured to send an alert if the service-state protocol is not complied with.

In an embodiment, the service-state monitor is configured to request from the network-connected device service-state information if the service-state protocol is not complied with.

Disclosed herein is a method for monitoring a service-state of a network connected device. The method comprises the step of receiving via a network service-state protocol information that defines at least one operational parameter for a service-monitoring protocol that comprises a network connected device sending to the service-state monitor a plurality of service-state messages that indicate a service state of the network connected device. The method comprises the step of receiving from the network connected device via the network the plurality of service-state messages.

An embodiment comprises sending an alert if the service-state protocol is not complied with.

An embodiment comprises requesting from the network-connected device service-state information if the service-state protocol is not complied with.

Any of the various features of each of the above disclosures, and of the various features of the embodiments described below, can be combined as suitable and desired.

BRIEF DESCRIPTION OF THE FIGURES

Embodiments will now be described by way of example only with reference to the accompanying figures in which.

DESCRIPTION OF EMBODIMENTS

Figure 1:
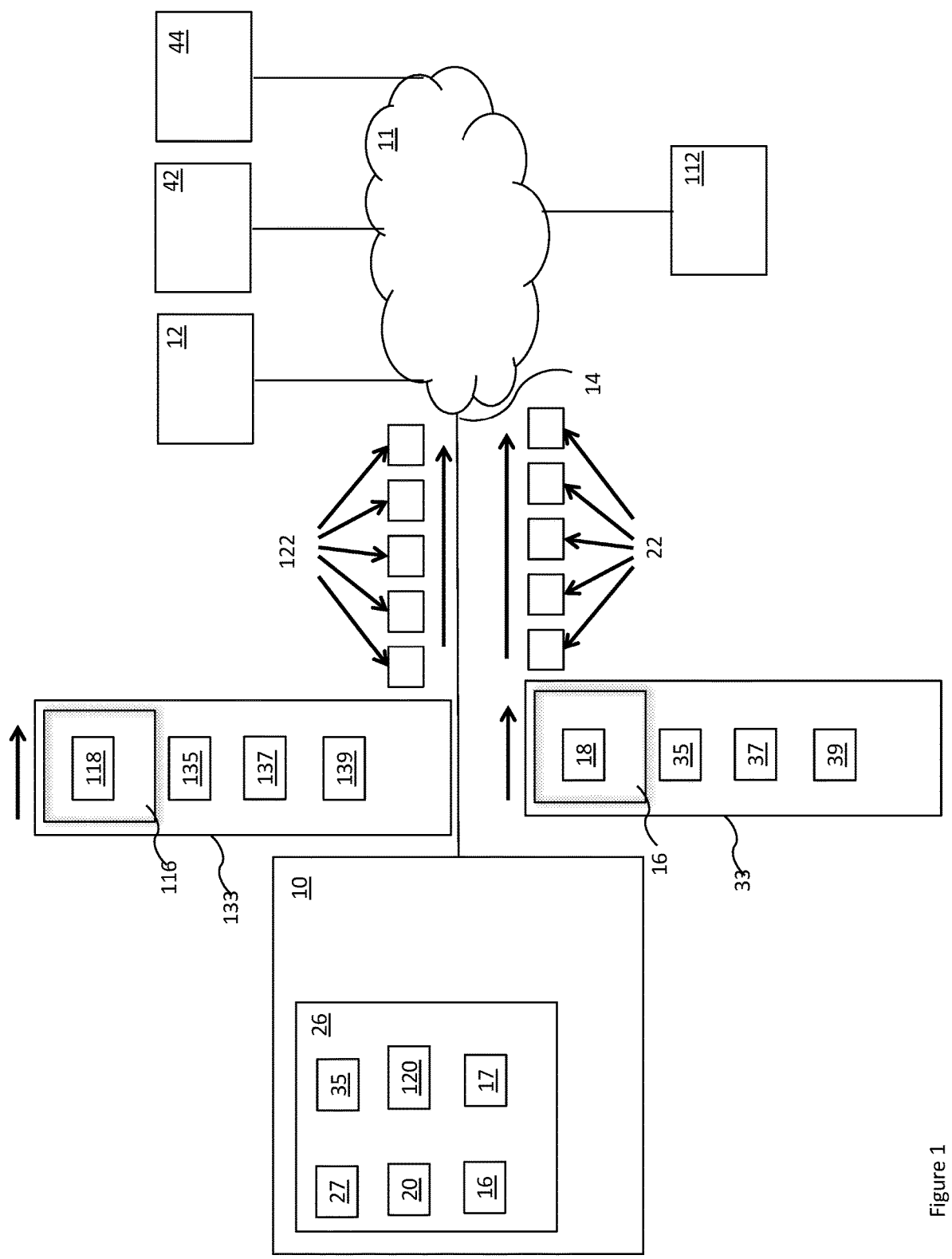
FIG. 1 shows a schematic diagram of an embodiment of a network connectable device connected to a network.

FIG. 1 shows a schematic diagram of an embodiment of a network connectable device 10 connected to a network 11. The network connectable device 10 is configured to send to a service-state monitor 12 via a network connection 14 service-monitoring protocol information 16 that defines at least one operational parameter 18 for a service-monitoring protocol 20. The service monitoring protocol 20 comprises sending to the service-state monitor 12 a plurality of service-state messages 22 that indicate a service-state of the network connectable device 10. The network connectable device 10 is configured to send to the service-state monitor 12 via the network connection 14 the plurality of service-state messages 22.

Each service-state message of the plurality of service state messages are in the present embodiment indicative that the network connectable device is operative at the time it was sent.

The network 11 is in the present embodiment a data network in the form of a digital data network, and may be any suitable network technologies, examples of which include but are not limited to a personal area network (PAN—for example a Bluetooth network), a local area network (LAN), a wide area network (WAN), a cellular network, a IEEE 802.3 network ("Ethernet" or variants thereof), a IEEE 802.11 network (Wi-Fi and variants thereof), a mesh network (for example a ZigBee network), a LPWAN network (for example a 6LoWPAN network or a SIGFOX network). The network 11 may be an internetwork comprising any suitable networks including those types disclosed above. The network 11 may be the internet.

Each of the plurality of service-state message 22 may only comprise of a datagram in the form of, for example, a packet, frame, cell, chip, data packet or data segment for transmission over the network 11. The datagrams may be, for example, in accordance with at least one of the IEEE 802.3 standards ("Ethernet" or variants thereof), IEEE 802.11 standards ("Wi-Fi" or variants thereof), TCP/IP standards (e.g. RFC 1122 or variants thereof), datagrams defined by a low power wide area network (LPWAN) protocol (for example SIGFOX, LoRa and LoRaWAN), however any suitable datagram may be used. The datagrams may generally have a header and a payload and an optional footer that may comprise a datagram check sequence (e.g. CRC). The header may comprise, for example, at least one of a destination MAC and/or IP address, and source MAC and/or IP address. The datagram may have a preamble and a start frame delimiter. The payload may comprise no more than identity information indicative of the identity of the network connectable device. In the present embodiment, however, the payload comprises further information about the service-state of the network connectable device 10. The further information indicative of the service-state of the network connectable device 10 is in the form of at least one byte in which is encoded service-state information indicative of one of a plurality of alternative service states of the network connectable device 10. The information may be alternatively encoded in more or less bits than in one byte. In an alternative embodiment, information indicative of the service-state of the network connectable device 10 is divided between more than one of the plurality of service state messages 22.

The network connection 14 is bi-directional, but may be unidirectional in an alternative embodiment. The service-monitoring protocol information 16 and the plurality of service-state messages 22 may be conveyed from the network connectable device 10 to the service-state monitor 12 using a wide range of communication protocols and/or standards. These protocols and standards may include transmission control protocol/internet protocol (TCP/IP), User Datagram Protocol (UDP), Constrained Application Protocol (COAP), syslog, EMAIL, SMS, SNMP, ModBus TCP and any other protocol or standard capable of conveying data. The service-monitoring protocol information 16 and the plurality of service-state messages 22 may be communicated and/or translated to a standard protocol format for processing by the service-state monitor. This may allow an algorithm of the service-state monitor to be effectively independent from the communications method and protocol used.

The network connectable device has a network interface in the form of a network interface controller (NIC). The NIC may be in the form of an IEEE 802.3 ("Ethernet") NIC, a IEEE 802.11 (Wi-Fi) NIC, a BLUETOOTH or other personal area network (PAN) protocol NIC, a Fiber Channel NIC, a Long Term Evolution (LTE) NIC, a NIC for a cellular network, a low power wide area network (LPWAN) protocol NIC, a SIGFOX protocol NIC, a 6LoWPAN protocol NIC, or generally any suitable form of NIC. The NIC may be in the form of a network interface card, or may be integrated with a system-on-a-chip, for example. The network connectable device 10 has a driver is in the form of program instructions (i.e. a software driver) that operates the network interface. The driver may communicate with the network interface controller via a bus or communications subsystem. The network interface controller may comprise a physical interface in the form of, for example, a network media connector in the form of an antenna or network cable connector. The network communications device 10 has a communications protocol stack comprising an internet protocol layer, a transport layer, and may comprise at least some of the link layer. The network connectable device 10 has a communications protocol stack in the form of a TCP/IP stack, however any suitable communications protocol stack may be used, for example a protocol stack in accordance with the Open Systems Interconnection (OSI) model. The TCP/IP stack may be configured for IPv6. The TCP/IP stack includes at least some, and generally but not necessarily all of, Internet Protocol (IP), Address Resolution Protocol (ARP), Internet Control Message Protocol (ICMP), Transmission Control Protocol (TCP), User Datagram Protocol (UDP), and IGMP. In addition to IP, ICMP, TCP, UDP, implementations configured for IPv6 include Neighbour Discovery Protocol (NDP), ICMPv6, and IGMPv6 and may include an integrated IPSec security layer. The communications protocol stack may have routing tables for dynamic routing rules. In the example of FIG. 1, the network connection 14 is an Internet connection and the network connectable device 10 is an internet connectable device.

Generally, the network connectable device 10 is one of a plurality of network connectable devices connected to the network 11. The network connectable device 10 may be configured to control and/or monitor a system. The network connectable device 10 may be a member of the Internet of Things (IoT) or a machine-to-machine communication system, and examples include but are not limited to computer servers, virtual computer servers, routers, switches and modems, radio equipment, and a generally any other network connectable device. Applications of embodiments of network connectable devices include but are not limited to environmental sensing, agriculture, e-health, intelligent transport systems, infrastructure and monitoring, smart homes & offices, utilities and other applications.

The network connectable device 10 may be in communication via the network 11 with an associated system 44. The network connectable device 10 is configured to send network connectable device data, in this but not all embodiments, to the associated system 44. The network connectable device data may be indicative of, for example, sensing data and device status data. The network connectable device 10 may send to the associated system 44 messages indicative of the network address of the service-state monitor 12 or monitors 12, 42 that it is registered with. This can be used as a backup in the event the network connectable device fails to register with one or more of the service-state monitors, for example to alert service personnel that the registration process has failed so that they can undertake corrective action in order to restore correct operation of the network connectable device.

The service-monitoring protocol information 16 is in this but not all embodiments indicative of the temporal spacing of the plurality of service-state messages 22. For example, the temporal spacing between the plurality of service-state messages 22 may be any one of 1 ms, 1 s, 1 ks, 1 Ms or a spacing less than or greater than these. The temporal spacing indicated may not be regular in an alternative embodiment. The service-monitoring protocol information 16 is also, in this but not all embodiments, indicative of a plurality of information fields common to each of the plurality of service-state messages 22.

Table 1 shows an example of the fields of the service-monitoring protocol information 16 used by the present embodiment, however alternative embodiments may use different fields containing different information or be of different length and/or format.

TABLE 1

Example service monitoring protocol information as arranged in fields.

| Idx | Name | Comments |
|---|---|---|
| 1 | Network connectable device MAC address | Unique MAC address of the network connectable device, as a 6-byte array, used as its unique identifier |
| 2 | Network connectable device IPv6 | IPv6 Address of the network connectable device as a 16-byte array |
| 3 | Service-state monitor IPv6 | IPv6 Address of the service state monitor as a 16-byte array |

TABLE 1-continued

Example service monitoring protocol information as arranged in fields.

| Idx | Name | Comments |
|---|---|---|
| 4 | Type of Network connectable device | Numerical classification of the type of network connectable device |
| 5 | Time | Time stored and kept track of by the network connectable device, which may be UTC Epoch time |
| 6 | Local Time Zone | Local time zone setting of the network connectable device. |
| 7 | Cadence | Rate at which the network connectable device sends service-state messages, which may be in Hertz |
| 8 | Tolerance | Amount of consecutive missed service-state messages before the service-state monitor should consider the network connectable device offline |
| 9 | Criticality | Numerical representation of the importance of the network connectable device within the application |
| 10 | Recovery Action | Numerical representation of action that Recipient should take when the network connectable device goes offline |
| 11 | Firmware Version | Version number of the firmware programmed in the network connectable device |
| 12 | Hardware Version | Version number of the network connectable device's hardware |
| 13 | Owner | Network connectable device owner identification, to allow status and fault notification |
| 14 | Service Technician | Network connectable device service technician identification information, to allow status and fault notification |
| 15 | Registration Definition Version Number | To identify to the service-state monitor the version of the service monitoring protocol, to allow updates to be identified |
| 16 | Registration Retry Count | Number of retry attempts to be undertaken in the event that registration with the service-state monitor fails |
| 17 | Regitration Retry Interval | Time interval in seconds between of retry attempts to be undertaken in the event that registration with the service-state monitor fails |
| 18 | Checksum | CRC16 Checksum |

Table 2 shows an example of the fields of each of the plurality of service-state messages 22 used by the present embodiment, however alternative embodiments may use different fields containing different information or be of different length and/or format.

TABLE 2

Example service-state message and the fields thereof.

| Idx | Name | Comments |
|---|---|---|
| 1 | Network connectable device MAC address | Unique MAC address of the network connectable device, as a 6-byte array, used as its unique identifier |
| 2 | Network connectable device IPv6 | Network connectable device IPv6 Address as a 16-byte array |
| 3 | Service-state monitor IPv6 | Sender service-state monitor IPv6 Address as a 16-byte array |
| 4 | Type of Network connectable device | Numerical classification of the type of network connectable device |
| 5 | Time | Time stored and kept track of by network connectable device, which may be UTC Epoch time |
| 6 | Local Time Zone | Local time zone setting of the network connectable device |
| 7 | Service-State Message Sequence Number | Sequence Number of the service-state message Payload. Incremented after each service-state message is sent. On startup, may be initialized to 0. When MAX_INT reached, may wrap to 1. |
| 8 | Last Service-State Message ACK Sequence Number | The sequence number of the last service-state message which the network connectable device received and sent an ACK for |
| 9 | Status | Network connectable device status<br>1 = normal operation<br>2 = minor fault<br>3 = major fault<br>4 = catastrophic fault - network connectable device unserviceable |
| 10 | Error Code | Numerical code for last error handled by the Network Connectable Device |
| 11 | Time Since Reboot | Time since the Network Connectable Device last performed a reset, seconds |
| 12 | Service-State MessageDefinition Rev | To allow the service-state monitor to determine which revision of the service monitoring protocol information to use |
| 13 | Checksum | CRC16 Checksum |

The network connectable device 10 comprises memory 26 that is loaded with information 27 for establishing the network location of the service-state monitor 12. The memory 26 is loaded with network location information 27 indicative of the network location for the service-state monitor 12. The network location information 27 comprises a network protocol address in the form of an IPv6 (or alternatively an IPv4 address), or other address information appropriate for the network type, for example a ZigBee network address in the case that the network connectable device 10 is connected to a ZigBee network. There may be a plurality of network protocol addresses loaded in the memory 26, which may be for a plurality of service-state monitors.

Some embodiments may additionally or alternatively comprise a MAC address or electronic serial number in the form of an alphanumeric symbol or string, for example a hexadecimal array or text string that contains information that uniquely identifies the network connectable device 10.

In the present but not all embodiments, the memory 26 is preloaded with the network location information 27. The memory 26 is loaded with the network location information 27 at at least one of the following:
- during manufacture of the network connectable device 10;
- during commissioning of the network connectable device 10; and
- at the time the network connectable device 10 is connected to the network for sending the plurality of service-state messages 22.

The network connectable device 10 may be, as in this embodiment, configured to generate a registration message 33 comprising the service-state monitoring protocol information 16 from information loaded in the memory 26. For example, the information of table 1 may be stored in the memory 26, and simply retrieved and sent as part of a packet's payload. The network connectable device 10 is configured to send to the service-state monitor 12 via the network connection 14 the registration message 33.

The registration message 33 comprises identification information 35 for the internet connectable device 10. The registration message 33 may, as in this embodiment, comprise network connectable device type information 37. The identification information 35 for the network connectable device 10 comprises an identifier uniquely identifying the network connectable device 10 to the service-state monitor 12. The identifier may comprise at least one of a MAC address, an electronic serial number, and a network protocol address, for example. In this embodiment, the identifier is a MAC address which is universally unique. Network addresses that are not universally unique may be used on partitioned networks.

The registration message 33 comprises service-monitoring protocol interruption reporting instructions 39. The instructions 39 may be stored in and retrieved by the network connectable device 10 from the memory 26. For example, the reporting instructions 39 may comprise instructions that when a predetermined number of the plurality of service-state messages are not received, that an alert message be sent to a maintenance system or a personal device (e.g. smart phone, pager), for example, for the attention of a user of the personal device. The alert message may be for maintenance personnel, for example, to alert them to the fact that a service interruption has occurred so that they can undertake maintenance actions in order to rectify the fault and restore service. An alert message may be sent to the owner or manager of the network connectable device or the system which incorporates it, for example, in order to allow the owner or manager to be aware of the loss of service and take appropriate actions such as not relying on the function of the network connectable device, or making use of alternative facilities which may be available.

The network connectable device 10 is configured to send to the service-state monitor 12 via the network connection 14 the registration message 33 when at least one of a network connection 14 is established and the network connectable device 10 is initialised. Changes may trigger the sending of the registration message, however. For example, the network connectable device 10 is configured to send to the service-state monitor 12 via the network connection 14 the registration message 33 when at least one of the network connectable device 10 is reconfigured, the network connection 14 performance changes, a network connectable device configuration changes, and a network connectable device characteristic changes. Reconfiguration may be a software or firmware upgrade. The network connection may slow down, in which case smaller service-state messages may be sent, and may be sent less frequently. Alternatively, if the network connection speeds up, larger service-state messages may be sent, and may be sent more frequently. An example of a network connectable device characteristic that may change is a network connectable device temperature. For example, the device may be more likely to fail at higher temperatures. A new registration message including a new service-state monitoring protocol may be sent. The service-state protocol may have an increased rate of sending service-state messages.

In this but not all embodiments, the service-monitoring protocol information 16 defines the service-monitoring protocol 20. The service-monitoring protocol information 16 comprises a service-monitoring protocol software. The software may define at least some, or all, of the service-monitoring protocol 20 for execution by the service-state monitor 12. The software may be written in any suitable programming language, and in the present example comprises a script. The script may be written in any suitable programming language, examples of which include but are not limited to BASIC, VISUAL BASIC, PYTHON, and PERL.

Figure 2:
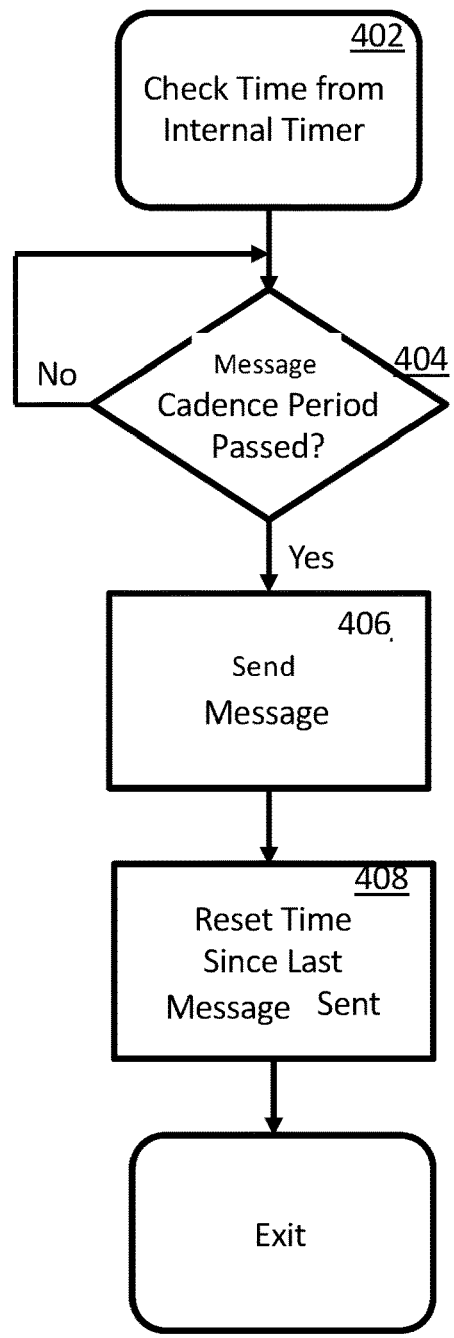
FIG. 2 shows a flow chart of an example of a service-state monitoring protocol.

The network connectable device 10 may have service-monitoring program instructions 17 in the form of software loaded in the memory 26, for example. When executed the service-monitoring program instructions 17 cause the network connectable device 10 to perform a method in accordance with the service-monitoring protocol. FIG. 2 shows a flow chart of an example of a service-monitoring protocol 400 performed by the network connectable device 10. In a step 402, the device 10 checks the time using an internal clock in the form of a timer. In another step 404, the device 10 determines if a message cadence period has passed. If not, then the time is checked again. If so, however, in another step 406 the device 10 sends a service-state message.

In another step 408, the device 10 resets the timer that maintains the time since the last service-state message was sent. The program instructions then returns to step 402.

The network connectable device 10 comprises a real-time clock which is synchronised to an external clock, for example a UTC clock. The network connectable device may be in communication with a time server accessible via the Internet, or external time sources such as GPS, for example.

A timestamp may be included in the service-monitoring protocol information 16 and service state message 22 payload, as a record of when the message was generated. An algorithm performed by the service-state monitor 12 may use the real-time clock information as a part of the network connectable device 10 service-state assessment process. Data that relates to each network connectable device 10 may can be stored by the service-state monitor 12 with a real-time timestamp. In cases where there is a bi-directional communications link between the network connectable device 10 and the service-state monitor 22, the service-state monitor may send real-time clock settings to each network connectable device 10 to synchronise its real-time clock. Alternatively, the maintenance system 44 or any other device with which the network connectable device 10 may be used to synchronise the network connectable device 10 to a real-time clock.

The network connectable device 10 is configured to send to another service-state monitor 112 other service-state monitoring information 116 defining at least one operational parameter 118 of another service-monitoring protocol 120 that comprises sending another plurality of service-state messages 122 to the other service-state monitor 112, and sending to the other service-state monitor 112 via the network connection 14 the other plurality of service-state messages 122. Information indicated by numerals 135, 137, and 139 are similar and/or identical to information 35, 37 and 39 respectively. The network connectable device 10 may be configured for, if no response is received from the service-state monitor 12, to send to the other service-state monitor 112 the other service-monitoring protocol information 116. The other service-monitoring protocol information 116 may contain the same or similar information as the service-monitoring protocol information 16, but it may be different. The other plurality of service-state messages may contain the same or similar information as the plurality of service-state messages, but it may be different. If no response is received from the service-state monitor 12, the network connectable device 10 may send a message to the maintenance system 42 or to a maintenance personal's device for example to alert service personnel that the registration process has failed so that they can undertake corrective action in order to restore correct operation of the network connectable device.

Each of the plurality of network connectable devices 10 may send the same service-monitoring protocol software, however in the present example each of the plurality of networking connectable devices do not send the same service-monitoring protocol software. This may be beneficial when different types of network connectable devices are used, or the network connections of the plurality of network devices have different speeds, availability etc. For example, one device may have a Wi-Fi network connection (e.g. IEEE 802.11ac), and another may have a much slower SIGFOX network connection. The software may have different functions and/or parameters for different network connectable device states and/or conditions, different times, during special events etc.

The network connectable device is configured to send an alert if no response to any one of the plurality of state messages is received from the service-state monitor 12.

Each of the plurality of service-state messages 22 is indicative of an impairment state of the network connectable device 10. In some embodiments, the presence of the message is a signal that there is no impairment of the network connectable device or the network connection. In another embodiment, however, each of the plurality of service-state messages 22 may comprise information indicative of the nature and/or degree of impairment. For example, an impairment may relate to a minor issue which can be dealt with at some future time as a regular maintenance activity, for example the requirement to clean or lubricate device. It could relate to an issue requiring urgent attention, such as impending depleting of a battery. Or it could relate to a serious defect, which impairs the operation of the device and requires immediate attention, such as failure of a sensor or actuator. This information would typically be conveyed by an indicator of the severity of the impairment "minor, significant, severe, catastrophic", or rating on a scale of 1 to 10, for example a value of 1 indicates a minor impairment, and a value of 10 indicates a catastrophic impairment.

In an alternative embodiment of a network connectable device, the network service-monitoring protocol information 16 is contained in at least one of the plurality of service-state messages 22. Table 3 shows an example of the fields of each of the alternative plurality of service-state messages 22, however alternative embodiments may use different fields containing different information or be of different length and/or format.

TABLE 3

Another example of a service-state message and the fields thereof.

| Idx | Name | Comments |
|---|---|---|
| 1 | Network connectable device MAC address | Unique MAC address of the network connectable device, used as its unique identifier |
| 2 | Network connectable device IPv6 | Network connectable device IPv6 Address as a 16-byte array |
| 3 | Service-state monitor IPv6 | IPv6 Address of the service-state monitor as a 16-byte array |
| 4 | Type of Network connectable device | Numerical classification of the type of network connectable device |
| 5 | Time | Time stored and kept track of by the network connectable device, which may be UTC Epoch time |
| 6 | Local Time Zone | The network connectable device's local time zone setting |
| 7 | Service-State MessageSequence Number | Sequence Number of the service-state message Payload. Incremented after each service-state message send. On startup, must initialize to 0. When MAX_INT reached, must wrap to 1. |
| 8 | Last Service-State Message ACK Sequence Number | The sequence number of the last service-state message which the Sender received and sent an ACK for |
| 9 | Status | Network connectable device status |
| 10 | Error Code | Last error handled by the network connectable device |
| 11 | Time Since Reboot | Time since the Sender last performed a reset |
| 12 | Service-State MessageDefinition Rev | To allow receiver to determine which revision of the service-state message definition to use |
| 13 | Checksum | CRC16 Checksum |
| 14 | Cadence | Rate at which the network connectable device sends service-state messages |

TABLE 3-continued

Another example of a service-state message and the fields thereof.

| Idx | Name | Comments |
|---|---|---|
| 15 | Tolerance | Amount of consecutive missed service-state messages before the service-state monitor should consider the network connectable device offline |
| 16 | Criticality | Numerical representation of the importance of the network connectable device within the application.<br>1 = non critical device<br>2 = low criticality device<br>3 = medium criticality device<br>4 = high criticality device<br>5 = essential device |
| 17 | Recovery Action | Numerical representation of action that service-state monitor should take when network connectable device goes offline |
| 18 | Firmware Version | Version number of the firmware programmed in the network connectable device |
| 19 | Hardware Version | Version number of the network connectable device's hardware |
| 20 | Owner | Network connectable device owner information, to allow status and fault notification |
| 21 | Service Technician | Network connectable device service technician information, to allow status and fault notification |
| 22 | Registration Retry Count | Number of retry attempts to be undertaken in the event that registration with the service-state monitor fails |
| 23 | Regitration Retry Interval | Time interval in seconds between of retry attempts to be undertaken in the event that registration with the service-state monitor fails |
| 24 | Registration Definition Version Number | To identify to the service-state monitor the version of the service monitoring protocol, to allow updates to be identified |
| 25 | Checksum | CRC16 Checksum |

The service-state monitor 12 is in communication with a maintenance system 42 in communication with the network 11. The communication is bidirectional but may be unidirectional in an alternative embodiment. The maintenance system 42 in the present embodiment comprises a virtual computer server having software and data storage, however it may comprise a physical computer server, a dedicated hardware system, or generally any suitable device or system. In an alternative embodiment, the maintenance system is integral to the service-state monitor 12. The maintenance system 42 has a network protocol address (e.g. IPv6). In the event that a service-monitoring protocol is interrupted the service-state monitor 12 sends a message to the maintenance system 44. The service-state monitor 12 may also log the interruption of the protocol to a time stamped event log file that may be stored in memory thereof.

Figure 6:
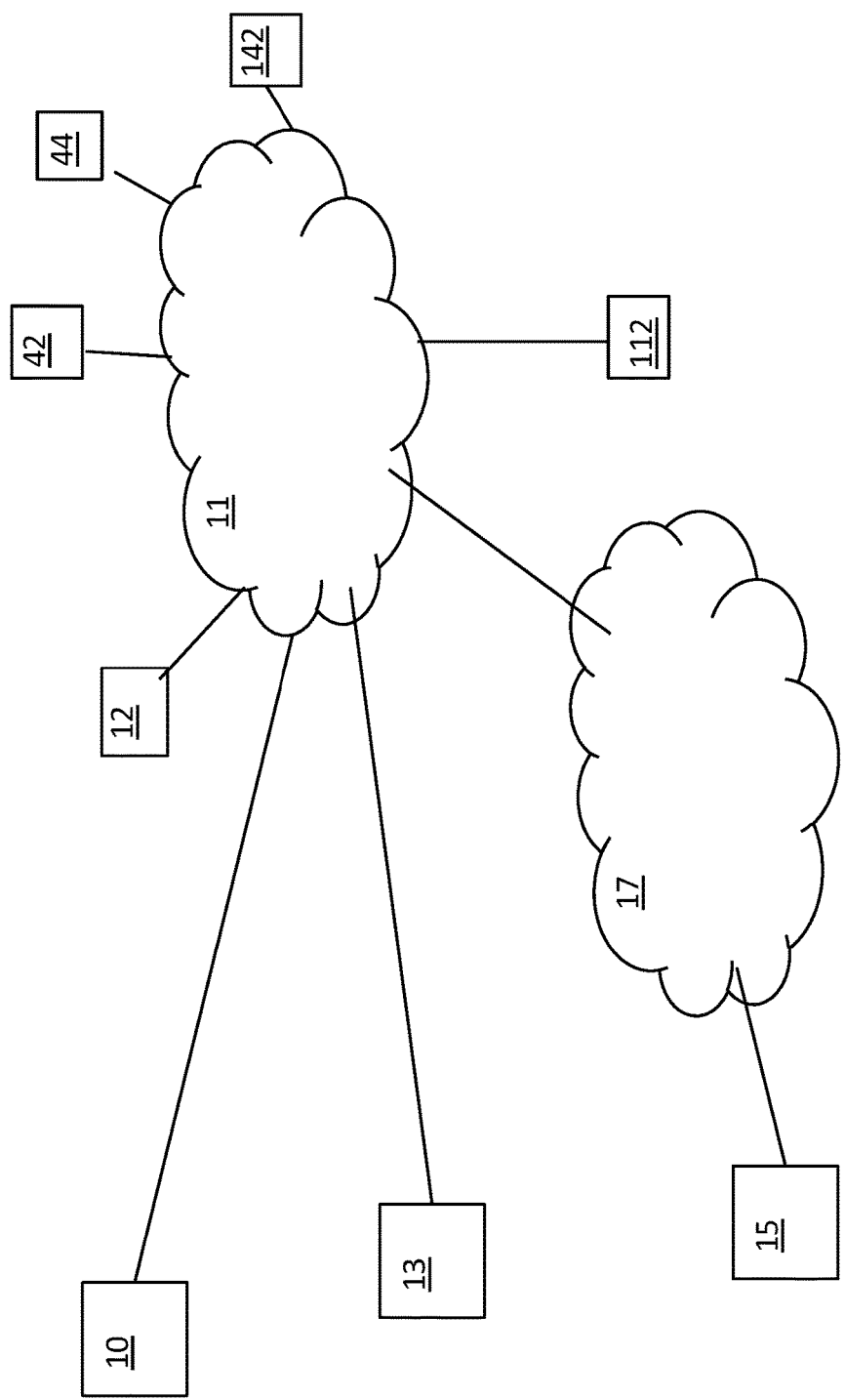
FIG. 6 shows an example of a system comprising a network 11, a network connectable device, a service-state monitor, and a management system.

FIG. 6 shows an example of a system comprising the network 11, the network connectable device 10, the service-state monitor 12, and the management systems 42, 142. The system comprises a plurality of network connectable devices 10, 13, 15, service state monitors 12, 112 and maintenance systems 42, 142, connected to the internetwork 11, 17. There may be an arbitrary number of each. There may be very many network connectable devices 10, 13, 15, for example thousands, millions or billions. Each of the plurality of network connectable devices 10, 13, 15 may communicate with any number of the plurality of service-state monitors 12, 112. Service-monitoring protocol information and service-state messages may be sent to more than one of the plurality of service state monitors 12, 112 by more than one of the network connectable devices 10, 13, 15. Each of the plurality of service-state monitors 12, 112 may communicate with any number of the plurality of maintenance systems 42, 142. Each of the plurality of maintenance systems 42, 142 may communicate with any number of the plurality of service-state monitors 12, 112.

Each of the plurality of network connectable devices 10, 13, 15 has memory 26 that stores information relating to the device's configuration. This information can be programmed into the device's memory 26 during manufacture, during device initial installation, or at any time following deployment of the device. During or following installation and commissioning of the device 10, 13, 15, it uses information stored in its memory 26 to generate service monitoring protocol information 16, which it then sends to one or more service-state monitors 12, 112, using the internet address of the service-state monitors 12 to route the service-monitoring protocol information 16 to each of them. Each service-state monitor 12, 122 records this information in its memory 26. If a network connectable device 10 configuration is changed whilst in service, updated service-monitoring protocol information 16 is sent to the service-state monitors 22. If network connectable device 10 loses its configuration, it can reload this information from a service-state monitor 22 where this information is stored. As an alternative embodiment, the maintenance system 44 or any other device with which the network connectable device 10 may communicate may be used to store the service-monitoring protocol information 16.

The plurality of network connectable devices may have a wide range of configurations, complexity, function criticality and power supply types. The network connections for each of the plurality of network connectable devices may be different, for example may have different speeds and costs. Accordingly, benefits may arise by selecting the protocol used for each of the plurality of network connectable devices. Trade-offs may be made between temporal separation of the plurality of service-state messages 22, the fields of each of the plurality of service-state messages, and other protocol parameters. For example, a battery powered sensing device which is active infrequently on a low duty cycle may send small service-monitoring messages at a low rate, e.g. once per day. A mains powered alarm device, may send large service-monitoring messages more frequently, for example every hour or more frequently.

The service-state monitor 12 comprises in the present, but not all examples, a virtual computer server comprising software and data storage. This may be efficient. In alternative embodiments, however, the service-state monitor may be a computer server, or a dedicated hardware device, for example, or generally any device or system that is configured to monitor the service-state of the network connectable device. The service-state monitor may generally be any suitable internet-of-things device, which may comprise a microcontroller, memory, sensors and/or controller, and a network interface. The network interface may take the form of a PHY, for example, and may additionally include modems, routers etc.

The software of the service-state monitor 12 may determine service-state by comparing the service-monitoring protocol and the plurality of service-state messages. This allows a range of services states of the network connectable device to be determined, for example minor failure, major failure, catastrophic failure and degraded communications. The software may trigger a service-state monitor behaviour, the behaviour being dependant on the determined service state. The behaviour may be at least in part defined by the service-monitoring protocol information 16. For example, a minor fault condition may be logged to a time stamped log file in the service-state monitor's memory, and may generate an alert on the maintenance system user interface in order to initiate a low-priority maintenance action. A more significant failure may give rise to the service state monitor 12 triggering an alert being sent, for example, to a service technician, for example via EMAIL or SMS. A major failure or a loss of capability in a safety-critical system may give rise to an alarm condition being asserted, and alerts being sent to multiple parties so that immediate action is undertaken to overcome the impact of the fault, and to repair it as quickly as practicable. Similarly, the number of successive missing service-state messages, or the percentage of expected service-state messages missed during a time period, may lead to an escalation of consequent maintenance system actions. The flexibility of the system may allow actions in the event of faults to be tailored to the nature and severity of the fault.

In some circumstances there is a risk that the service-state monitor 12 may give rise to an excessive number of fault notifications, for example due to a transient communications system fault or other short duration event. There may be a bi-directional communications link between the network connectable device 10 and the service-state monitor 12, and in the event that the software determines that a fault is present, the service-state monitor 12 could undertake a process to confirm the presence of the fault, by sending one or more service-state message requests to the network connectable device 10, causing it to respond and send a service-state message. Once the service state monitor 12 detects a fault with the network connectable device 10, it may send a message via the network to the network connectable device requesting it to return its status. Assuming that the network connectable device 10 is able to communicate, the network connectable device 10 sends a message to confirm the nature of the fault, generally but not necessarily via the network 11.

Following deployment of a network connectable device 10, in certain circumstances it may be desirable to change the service-monitoring protocol. The service-state monitor 12 or the maintenance system 42 or the networkable devices' associate system 44 or some other system connected to the network 11, may reprogram the network connectable device 10 with new service-monitoring protocol information 16. The network connectable device will then repeat its registration process with service-state monitor 12, and subsequently send messages in accordance with the changed service-monitoring protocol.

The service-state monitor software uses the plurality of service-state messages 22 to monitor communications link quality from the network connectable device 10 to the service-state monitor 12, by determining the percentage of missing service-state messages in a given time period, and where available, other such link characteristics such as signal to noise ratio, signal strength, etc. This capability may be enhanced as follows. Communications devices (for example switches, routers) may monitor the quantity of each communication link, and append to the service-state messages information relating to link quality. In cases where there is a bi-directional communications link between the network connectable device 10 and the service-state monitor 12, this capability can be further enhanced by appending link quality information to acknowledgment messages from the service-state monitor 12 to the network connectable device 10, this information being relayed back to the service-state monitor 12 in the plurality of service-state messages. In cases where there is a bi-directional communications link round trip time latency of the communications link between the network connectable device 10 to the service-state monitor may also be determined. Link quality information may be used by the maintenance system 44 as the basis for improving communications network performance and reliability.

The service-state monitor 12 can route communications to itself via the network 11 for checking network connectivity, for example by looping service state messages 22 to itself via the network 11.

Figure 3:
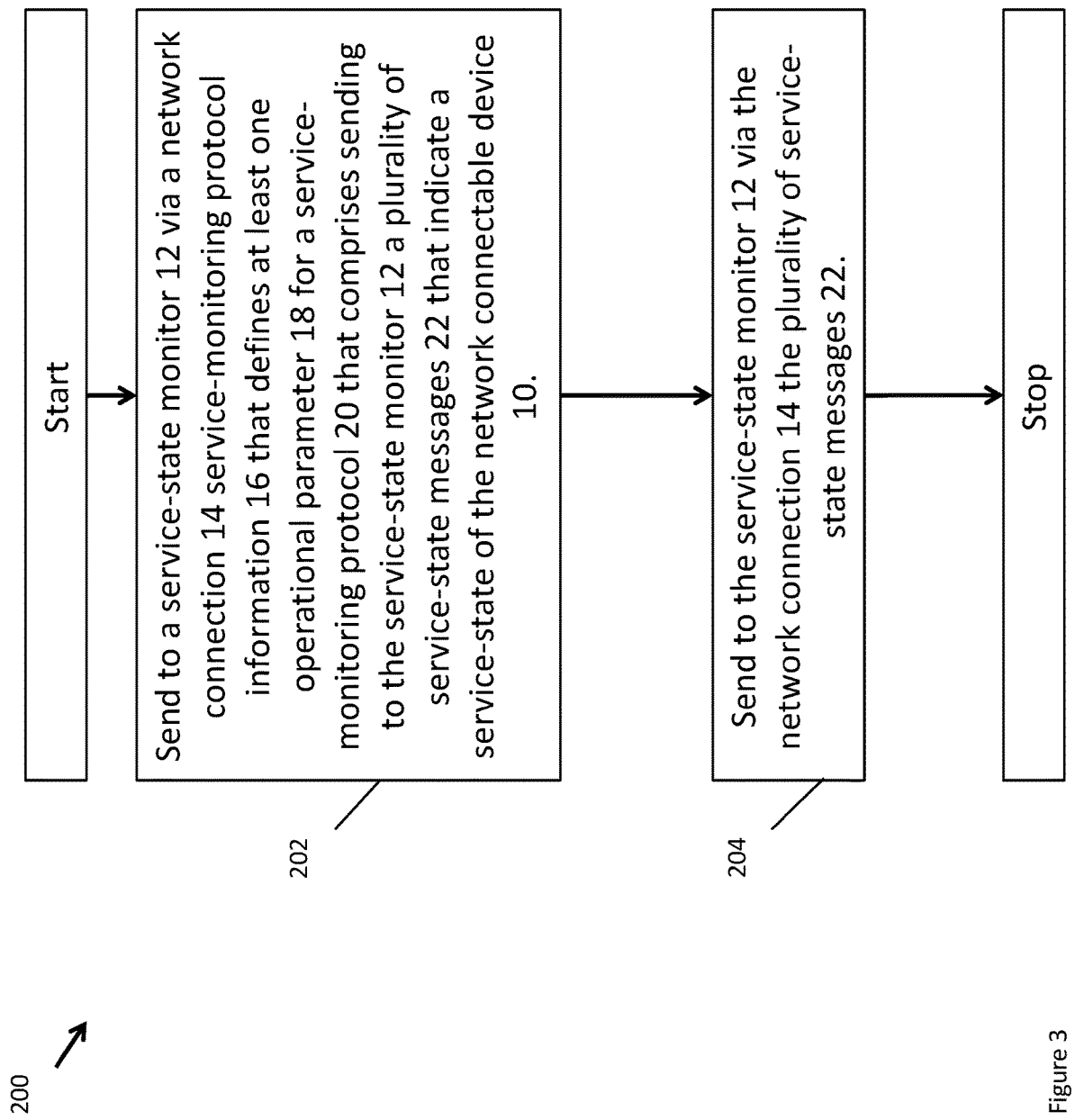
FIG. 3 shows a flow chart of an embodiment of a method for monitoring a service-state of a network connected device.

An embodiment of a protocol 200 for monitoring the service-state of the network connectable device 10 when so connected ("the network connected device") will now be described with reference to FIG. 3. The network connected device 10 described herein may perform the steps of the method 200. The method 200 comprises the step 202 of sending to a service-state monitor 12 via a network connection 14 service-monitoring protocol information 16 that defines at least one operational parameter 18 for a service-monitoring protocol 20. The service monitoring protocol comprises sending to the service-state monitor 12 a plurality of service-state messages 22 that indicate a service-state of the network connectable device 10. The method comprises the step of sending to the service-state monitor 12 via the network connection 14 the plurality of service-state messages 22.

In this but not all embodiments, each of the plurality of service-state messages indicate the service-state of the network connectable device 10 when sent.

Figure 4:
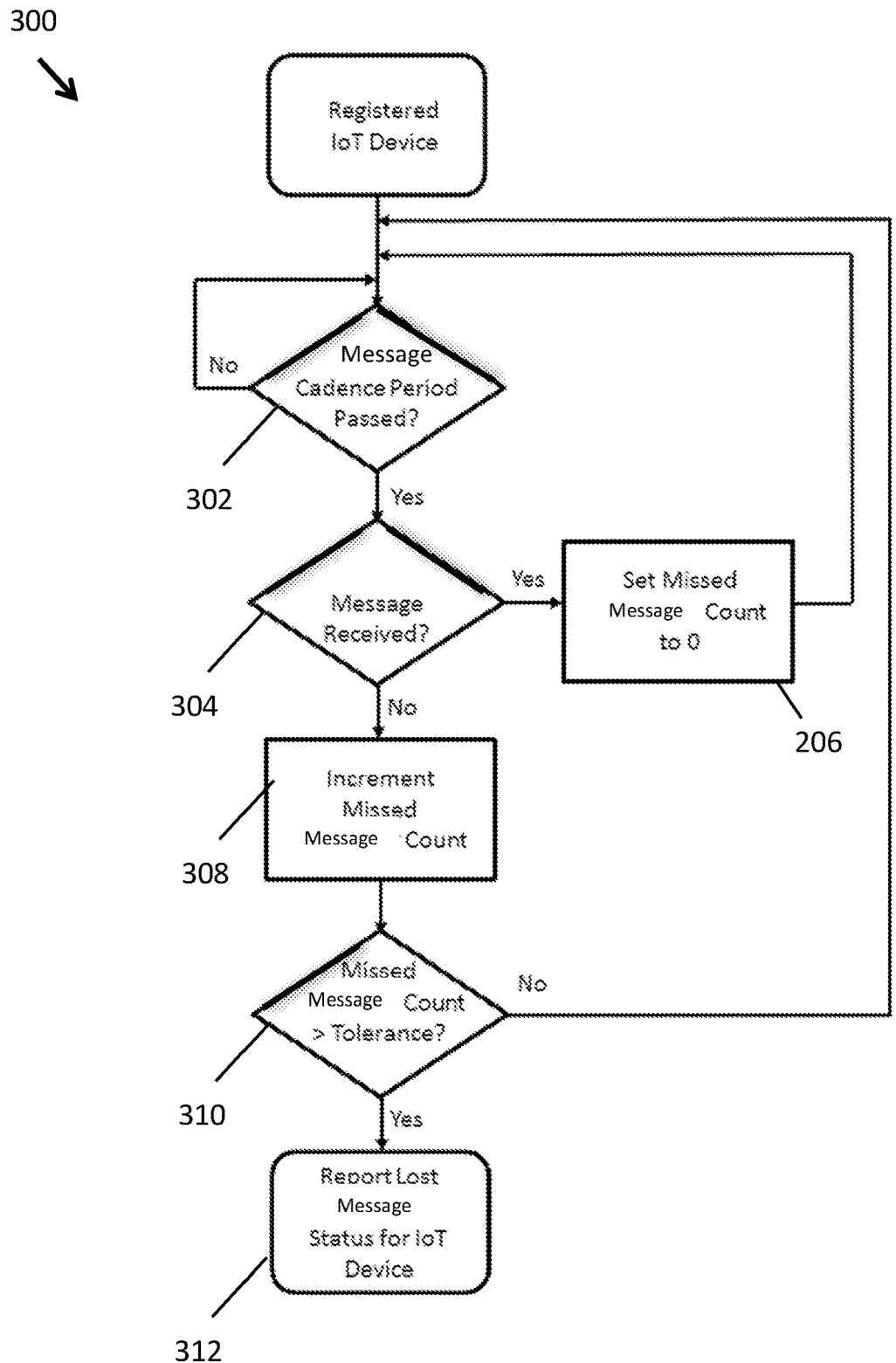
FIG. 4 shows a flow chart of an example of a service-state monitoring protocol.

FIG. 4 shows a flow diagram of another example of a protocol 300 for monitoring the service-state of the network connected device 10. In a step 202, it is determined if a service-state message cadence period has passed. If not, then this step is repeated. If the service-state message cadence period has passed, then step 304 is performed in which it is determined if the service-state message has been received. If so, then a missed message count variable is set to a value of 0 in step 306 and the method returns to the beginning. If the service state message has not been received, then in step 308 the missed message count is incremented. In step 310, it is determined if the missed service-state message count exceeds a tolerance value, and if so in step 312, a lost message status is reported for the network connected device.

If at step 310 it is determined the tolerance value is not exceeded, then the method returns to the beginning.

Example Network Connectable Device 1

Figure 5:
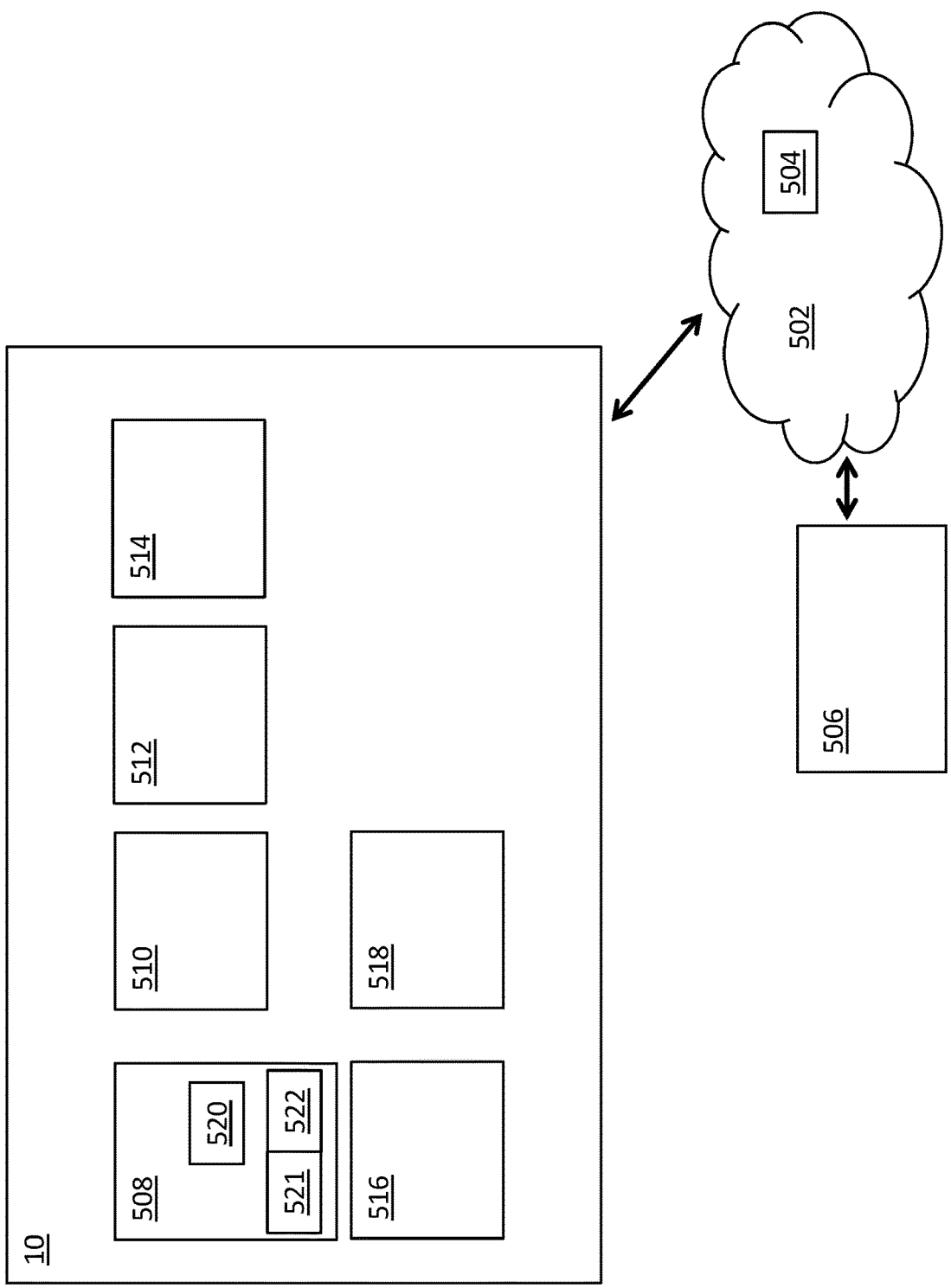
FIG. 5 shows a schematic diagram of the architecture of another embodiment of a network connectable device.

FIG. 5 shows a schematic diagram of the architecture of the network connectable device 10. The network connectable device 10 is the form of a smoke alarm, and is configured for detecting smoke and sounding an alarm when smoke is so detected. The smoke alarm 10 is connected to a network 11 in the form of at least one of a Ethernet network and a 6LoWPAN meshed wireless communications network. The communications network 11 provides local area connectivity and comprises an Internet gateway 504 for providing the smoke alarm with Internet connectivity. The network connectable device 10 sends service-state messages to a service-state monitor 22 via the network 11 and optionally via the Internet gateway 504. A faulty smoke alarm is a safety concern. A fault in the smoke alarm 10 may be detected and it may subsequently be repaired or replaced.

The smoke alarm 10 comprises a processor in the form of a system-on-a chip device 508 in the form of a CC2650 integrated circuit manufactured by Texas Instruments. The network connectable device comprises non-volatile memory 510 in the form of FLASH of type WQ 25Q32, a 2.4 GHz antenna 512, a battery 514, a smoke sensor 516 and an audible alarm generator 518. The system-on-chip 508 includes a microcontroller core 520 with internal non-volatile FLASH memory for storing program instructions, and RAM for variables. The microcontroller is in the form of a Cortex M3. The FLASH memory stores program instructions in the form of software that consists of a CONTIKI operating system, application software for overall device operation and communications protocol stacks in the form of a TCP/IP stack and a 6LoWPAN protocol stack. The program instructions include service-state monitoring protocol program instructions which when executed by the processor causes the network connectable device 10 to execute the steps of a method in accordance to the service monitoring protocol. The plurality of service-state messages are generated by program instruction running on the processor 508, the program instructions then instructing one of the network interface controllers via one of the protocol stacks to cause the antenna or an transceiver in the form of an Ethernet transceiver to send the plurality of messages over network media (for example, network cables or space).

The serial non-volatile FLASH memory 510 connected to the system-on-chip via a SPI interface has stored therein non-volatile memory network location information in the form of a globally unique MAC address, and/or an IPV6 network address. The memory 510 also stores service monitoring protocol data. The MAC address and service monitoring protocol data are programed into the serial FLASH during network connectable device 10 manufacture. The IPV6 network address is assigned to the network connectable device 10 by a Border Router of the network 502. The service monitoring protocol data 506 may be updated in the field by the service state monitor via the 6LoWPAN network.

The system-on-chip device 508 comprises a network interface controller 521 in the form of a 6LoWPAN network interface controller and a 2.4 GHz radio transceiver 522, which provides bi-directional connectivity to the network 502, via the 2.4 GHz antenna 512. Communications over the network 502 uses the COAP protocol.

A processor-smoke sensor interface is implemented via an analogue to digital converter that digitises the smoke detector sensor 516 output. A processor-audible alarm interface is implemented via an output driver. The device 10 may optionally be configured to send a message via the 6LoWPAN to a monitoring system when the smoke is so detected. The service-state monitoring system 22 may be, for example, a building management system or fire protection system.

Example Network Connectable Device 2

An example of yet another network connectable device comprises an uninterruptable power supply (UPS) in the form of a battery backup power inverter. The battery backup power converter is connected to a network in the form of a 10/100 Ethernet network that provides local area connectivity, and Internet connectivity via an Internet gateway of the Ethernet network. The battery backup power inverter provides power in the form of AC power to equipment connected thereto in the event of mains power failure.

Some applications of the battery backup power inverter are safety-critical (for example backup power for a life support system) and continued operation of the battery backup inverter may be necessary. The battery backup power inverter sends service-state messages to a service-state monitor. A fault may be detected and repaired or replaced by service personnel, in some circumstances rapidly.

The battery backup power inverter hardware comprises an NXP microcontroller LPC1788, in conjunction with a serial EUI-64 EEPROM memory type DS2502-E64, a 32 GByte SD memory card, an Ethernet PHY, an AC to DC battery charger, a battery bank, a DC to AC power inverter and a current and voltage monitor. The device is controllable by and reports its status via the network to a reporting and/or control system, for example a building management system. The microcontroller includes a Cortex M3 microcontroller core with internal non-volatile FLASH memory for storing program instructions, and RAM for variables. The FLASH memory stores software, which consists of an RTOS operating system, application software for overall device operation and an Ethernet protocol stack. Additionally, the software includes a service monitoring protocol program which implements the service monitoring protocol.

The serial EUI-64 non-volatile EEPROM memory which includes a globally unique 64-bit MAC address is connected to the microcontroller via an I2C interface and provides non-volatile storage of network location information. A Secure Digital (SD) card connected to the microcontroller via an SD card interface provides non-volatile storage for multiple service monitoring protocol information. A globally unique 64-bit MAC address is coded into the microcontroller. The service monitoring protocol data are programed into the serial EEPROM and the SD card during device manufacture. The IPV6 network address is assigned to the network connectable device by the DHCP server of the Ethernet network to which the device is connected. The service monitoring protocol data can be updated in the field by the service state monitor via the network.

The microcontroller incorporates an Ethernet MAC, which provides bi-directional connectivity to the Ethernet network, via an Ethernet PHY. Communications over the Ethernet network uses the Ethernet industrial protocol.

The interface with the AC to DC battery charger and DC to AC power inverter is implemented using a Serial Peripheral Interface Bus (SPI) for control and monitoring of these modules. The device is powered redundantly from AC mains and from the battery bank.

Example Network Connectable Device 3

In this example, the network connectable device comprises a computing device having a processor package. The network connectable device is in the form of a smart phone or tablet computer having onboard instruments in the form of an accelerometer and a GPS unit in active use. The processor package comprises a single die on which is a multi-core processor. The processor package comprises a case encapsulating the die, which protects the die and has electrical contacts in the form of pads for electrically connecting the package. An alternative processor package has a single microprocessor on the single die. The processor package is in the form of a system-on a chip (SoC) or micro-controller. The processor package may be mounted on a printed circuit board, wherein the pads of the processor package are soldered to contacts on the printed circuit board (PCB). A printed circuit board assembly (PCBA), which comprises the PCB, the processor package and optionally other electronics, is mounted in a computing device housing. An alternative embodiment of the computing device comprises a plurality of intercommunicating microprocessor dies in the form of a multi-chip modules, for example. Generally, any form of processor package may be used.

Examples of processor packages include the QUALCOMM SNAPDRAGON processors (including models 810, 820, and 821), SAMSUMG EXYNOS 8890, x86 processors including the INTEL ATOM processor, single core ARM CORTEX A5, multicore ARM CORTEX-A17, APPLE A9X, and APPLE A10.

The network connectable device runs an operating system in the form of an open source operating system, however it may not be an open source operating system in alternative embodiments. The open source operating system is LINUX in the form of GOOGLE ANDROID. Examples of alternative operating system that may be used include but are not limited to WINDOWS, MAC OS, iOS, BLACKBERRY OS, CHROME OS, and OPENWRT.

The communications protocol stack and the driver for the network interface controller may reside in a kernel of the computing system's operating system 10, for example in a LINUX kernel, (which UBUNTU and GOGGLE ANDROID may use, for example). An example of a LINUX kernel is GOOGLE ANDROID NETX. The driver and the communications protocol stack have interfaces in the form of application programming interfaces (API) for intercommunication Program instructions in the form of application software, for example, implementing an application layer protocol, for example HTTP, FTP, SSH, etc. may request communication services from the communications protocol stack. The processor runs a LINUX kernel (for example ANDROID NETX), and the application software generally instructs a BSD socket interface implemented by the LINUX kernel to open a socket for a network address comprising an internet protocol address. Applications may generally open any suitable type of socket, including a UNIX socket, and transport layer sockets examples of which include but are not limited to a UDP socket and a DCC socket.

Example Service State Monitor 1

An example of a service-state monitor will now be described. This example of a service-state monitor is connected to a network in the form of a 10/100 Ethernet network, which provides local area connectivity, and Internet connectivity via an Internet gateway of the network. The service-state monitor is configured to service the plurality of network connectable devices.

The service state monitor hardware comprises a server processor motherboard, in conjunction with a RAID array disk providing 5 by 1 TeraByte redundant storage disk drives. The physical service device connects to the Ethernet network, and thence to the Internet using TCP/IP, via a gateway device. The device is powered from an AC mains supply.

The server processor motherboard hosts a Xenon E5 microcontroller core, along with RAM memory for hosting program code, and RAM for variables. The RAM memory hosts software which consists of a Windows Server operating system, application process software for overall device operation and an Ethernet protocol stack. Additionally, the software includes multiple service state monitor programs, which implement the service monitoring protocol for each of the served network connectable devices.

The RAID array disk provides non-volatile storage for the device's operating system and application process software modules, globally unique MAC address and IPV6 network address. It also provides non-volatile storage for multiple service monitoring protocol information for the served network connectable devices. The operating system, application processes, and MAC address are loaded into the RAID array disk during device commissioning. The IPV6 network address is assigned to the network connectable device by the DHCP server of the Ethernet network. The operating system and application processes can be updated in the field via the Ethernet network. The service monitoring protocol information is programmed to the RAID array disk as each network connectable device registers with the service state monitor.

The server processor motherboard incorporates the Ethernet MAC, which provides bi-directional connectivity to the Ethernet network, via the Ethernet PHY. Communications over the Ethernet network uses the Ethernet Industrial Protocol.

Example Service State Monitor 2

Another example of a service-state monitoring device will now be described. This example is configured as a virtual server in the cloud, connected to the Internet using TCP/IP.

The implementation is analogous to that described above for a physical server, but is implemented using a virtual server provided by Amazon Web Services, and associated virtual data storage. The physical implementation is similar to that described for the physical server, but will be a shared resource in a server farm managed by Amazon. The existence and nature of the physical device is opaque to the service-state monitoring service, which is only cognizant of the virtual resources provided by Amazon Web Services.

Example Maintenance System

An example maintenance system will now be described. This example is configured as a physical server device connected to a network in the form of a 10/100 Ethernet network, which provides local area connectivity, and Internet connectivity via an Internet gateway of the network. The device provides facilities to host the maintenance system.

The maintenance system hardware comprises a server processor motherboard, in conjunction with a RAID array disk providing 5 by 1 TeraByte redundant storage disk drives. The device connects to the Ethernet network, and thence to the Internet using TCP/IP, via a gateway device. The device is powered from an AC mains supply.

The server processor motherboard hosts a Xenon E5 microcontroller core, along with RAM memory for hosting program code, and RAM for variables. The RAM memory hosts software which consists of a Windows Server operating system, application process software for overall device operation and an Ethernet protocol stack. Additionally, the software includes user information alert process and a service technician alert process software modules.

The RAID array disk provides non-volatile storage for the device's operating system and application process software modules, globally unique MAC address and IPV6 network address. It also provides non-volatile storage for storage of a network connectable device database, user database and a service technician database. The operating system and application processes and MAC address are programed onto the RAID array disk during device commissioning. The IPV6 network address is assigned to the network connectable device by the DHCP server of the network. The operating system and application processes can be updated in the field via the Ethernet network. The network connectable device database, user database and a service technician database are programmed into the device during commissioning and are updated periodically over the internet during normal operation, by system operators.

The server processor motherboard incorporates an Ethernet MAC, which provides bi-directional connectivity to the Ethernet network, via the Ethernet PHY. Communications over the Ethernet network uses the Ethernet Industrial protocol. The server processor motherboard incorporates a 3G/4G cellular data modem, which provides connectivity to a cellular data network.

The network connectable device database stores the unique identities of network connectable services served by the maintenance system, and links each network connectable device to a user who is the owner of the device, and the service technician who is responsible for its maintenance. The user database contains information about users, including their identity and contact information. The service technician database contains information about service technicians, including their identity and contact information.

A user information alert process software module receives information about network connectable device failures from the service state monitor, and sends alert information about the failure to the user who is the owner of the network connectable device. The alert may be sent by EMAIL over the Internet or as an SMS over the cellular data network.

The service technician information alert process software module receives information about network connectable device failures from the service state monitor, and sends alert information about the failure to the service technician who is responsible for the maintenance of the network connectable device. The alert may be sent by EMAIL over the Internet or as an SMS over the cellular data network.

Registration Message Example

The tables below are representations of example service monitoring protocol information as arranged in fields, and a service-state message arranged in fields.

Example Service Monitoring Protocol Information as Arranged in Fields.

| Idx | Name | Contents | Comment |
|---|---|---|---|
| 1 | Network connectable device MAC address | 0xA37F23ED5C2B | |
| 2 | Network connectable device IPv6 | 0x20010DB8AC10FE0126C7AC5BE72F14C9 | |
| 3 | Service-state monitor IPv6 | 0x30F24EB984FCD24A67B4307F2DE971C3 | |
| 4 | Type of Network connectable device | 2 | Type 2 = Battery powered wireless smoke alarm |
| 5 | UTC Epoch Time | 1460939793 | 2016-04-18 00:36:33 |
| 6 | Local Time Zone | 10 | UTC + 10 |
| 7 | Cadence | 3600 | Once per hour |
| 8 | Tolerance | 3 | 3 missed service state messages allowed |
| 9 | Criticality | 5 | essential device |
| 10 | Recovery Action | 7 | Action 7 = notify owner and service technician |
| 11 | Firmware Version | 0A03 | version A revision 3 |
| 12 | Hardware Version | 0B01 | version B revision 1 |
| 13 | Owner | owner@emaliserver.com | owner's EMAIL address |
| 14 | Service Technician | 61421334675 | service technician's mobile device number |
| 16 | Registration Definition Version Number | 1 | first version of this service monitoring protocol |
| 17 | Registration Retry Count | 3 | 3 registration retries |
| 17 | Regitration Retry Interval | 600 | Retry every 600 seconds |
| 18 | Checksum | 0xA74F | message CRC-16 |

Example Service-State Message and the Fields Thereof.

| Idx | Name | Comments | |
|---|---|---|---|
| 1 | Network connectable device MAC address | 0xA37F23ED5C2B | |
| 2 | Network connectable device IPv6 | 0x20010DB8AC10FE0126C7AC5BE72F14C9 | |
| 3 | Service-state monitor IPv6 | 0x30F24EB984FCD24A67B4307F2DE971C3 | |
| 4 | Type of Network connectable device | 2 | type 2 = Battery powered wireless smoke alarm |
| 5 | UTC Epoch Time | 1460939793 | 2016-04-18 00:36:33 |
| 6 | Local Time Zone | 10 | UTC + 10 |

-continued

| Idx | Name | | Comments |
|---|---|---|---|
| 7 | Service-State Message Sequence Number | 27 | 27th service state message sent to service state monitor by the network connectable device |
| 8 | Last Service-State Message ACK Sequence Number | 26 | |
| 9 | Status | 1 | normal operation |
| 10 | Error Code | 0 | no error |
| 11 | Time Since Reboot | 3689427 | |
| 12 | Service-State Message Definition Rev | 1 | first version of this service monitoring protocol message CRC-16 |
| 13 | Checksum | 0x42D6 | |

Network Example

An example of a specific network, having various physical layer types and protocols, will now be described together with the structure of the messages of the devices described herein and the network interfaces of the devices described herein. With the network comprises network connectable devices in the form of a battery powered wireless smoke alarm, and a UPS in the form of a battery backup power converter in a hospital. The hospital system may comprise a multiplicity of types of network connectable devices connected to various inter-networks which are all ultimately connected to the Internet.

The safety-critical function of the battery powered wireless smoke alarm and battery backup power inverter means that their continued operation is vital. The service-state monitor receives service-state messages from the battery powered smoke alarm. This allows faulty devices to be rapidly detected and repaired or replaced by service personnel.

The battery powered wireless smoke alarm is connected to a 6LoWPAN wireless network, over which it communicates with the 6LoWPAN border router using COAP. The 6LoWPAN border router in turn communicates with an Ethernet network via Ethernet/IP, and routes messages between the 6LoWPAN and Ethernet networks with protocol translation between COAP and Ethernet/IP.

The battery backup power inverter is connected to the Ethernet network, over which it communicates via Ethernet/IP.

Also connected to the Ethernet network is an ADSL modem router, which communicates with Internet-connected devices using TCP/IP. The ADSL modem router routes messages between the Ethernet network and the Internet, with protocol translation between Ethernet/IP and TCP/IP.

The service state monitor is hosted in the cloud, and connects to the Internet. The maintenance system is hosted on a physical server and connects to the Internet. Also connected to the Internet is a personal computer (PC) for the owner of the smoke alarm and/or battery backup power inverter. The ADSL modem router, service state monitor, maintenance system and network connectable device owner's PC can all communicate over the Internet using TCP/IP. The maintenance system connects to the cellular data network, as does the service technician's smart phone.

The battery powered wireless smoke alarm and battery backup power inverter send service state messages to the service state monitor, which implements the corresponding service state monitor programs. In the event of a fault occurring with either network connectable device, the service state monitor determines this via the service monitoring protocol and sends an alert message to the maintenance system, which in turn sends an EMAIL alert to the network connectable devices' owner's PC, and an SMS alert to the smartphone of the field service technician who is responsible for maintaining the network connectable devices.

Example Service Monitoring Protocol Program

The service monitoring protocol program in the network connectable device implements the service monitoring protocol functions of the network connectable device.

When the network connectable device is connected to a network and wishes to register with one or more service-state monitors, its software constructs a registration message using network location and service-monitoring protocol information stored in its memory. The network connectable device sends this information to the service-state monitor over the network connection and thence the network.

If so instructed by the service-monitoring protocol, the network connectable device software awaits receipt of an acknowledgment message sent over the network from the service-state monitor, to confirm correct receipt of the registration message. If acknowledgment is expected but not received within a time prescribed by the service-monitoring protocol, the network connectable device will retry the registration process with that service-state monitor for a number of times and at time intervals, which are also prescribed by the service-monitoring protocol.

If so configured, the network connectable device's software may then repeat this process for additional service-monitoring protocols for that service-state monitor; and/or for service-monitoring protocols for that service-state monitor; or for that and/or other service-monitoring protocols for other service-state monitors.

Following the process of network connectable device registration of service-monitoring protocol(s) with service-state monitor(s), the network connectable device's software will commence the process of sending service-state messages to the service-state monitor(s), in accordance with the service-monitoring protocol(s) which it has registered with the service-state monitor(s). The schedule of transmission of service-state messages by the software is determined by the service-monitoring protocol, which causes those service-state messages to be sent.

The software constructs each service-state message using network location and service-monitoring protocol information stored in its memory. The network connectable device sends this information to the service-state monitor over the network connection and thence the network.

Service State Monitor Program

Service state monitor program instructions in the form of software in the service-state monitor implements the service monitoring protocol functions of the service-state monitor.

The service-state monitor software monitors the network for service-monitoring protocol registration messages received over the network from network connectable devices. When a service-monitoring protocol registration message is received over the network from a network connectable device, the service-state monitor software stores the service-monitoring protocol information in its database memory, identified by the network location of the network connectable device.

If so instructed by the service-monitoring protocol, the service-state monitor software will send an acknowledgment message over the network to the network connectable device, to confirm correct receipt of the registration message.

The service-state monitor software then commences implementation of the service-monitoring protocol for that network connectable device. The service-state monitor software expects to receive a sequence of service-state messages from that network connectable device, and implements the service-monitoring protocol in order to determine the service state of the network connectable device.

If the received sequence of service-state messages from the network connectable device fails to meet the requirements of the service-monitoring protocol for the network connectable device to be determined as being in normal service, the service-state monitor software will generate and send alert messages to the maintenance system, which will then forward the alert to network connectable device owner and/or responsible service technician as prescribed by the service-monitoring protocol.

The service-state monitor software will continually undertake this processing for all service-monitoring protocols registered with it by all network connectable devices that have registered with it.

The service-state monitor software may receive updated service-monitoring protocol information from network connectable devices, which have registered with it. In this instance, the corresponding service-monitoring protocol information for that network connectable device is updated with the new service-monitoring protocol.

The service monitoring protocol program and service state monitor program can be implemented by any suitable processing platform, including a microcontroller, embedded processor, personal computer, FPGA or ASIC implementation, for example.

Variations and/or modifications may be made to the embodiments described without departing from the spirit or ambit of the invention. The present embodiments are, therefore, to be considered in all respects as illustrative and not restrictive. Reference to a feature disclosed herein does not mean that all embodiments must include the feature.

Prior art, if any, described herein is not to be taken as an admission that the prior art forms part of the common general knowledge in any jurisdiction.

In the claims which follow and in the preceding description of the invention, except where the context requires otherwise due to express language or necessary implication, the word "comprise" or variations such as "comprises" or "comprising" is used in an inclusive sense, that is to specify the presence of the stated features but not to preclude the presence or addition of further features in various embodiments of the invention.

The invention claimed is:

1. A network connectable device configured to:
generate a registration message comprising service-monitoring protocol information for use by a service-state monitor, the service-monitoring protocol information defining at least one operational parameter of a service-monitoring protocol operable to determine operability of the network connectable device, the service monitoring protocol comprising sending to the service-state monitor a plurality of service-state messages in accordance with the at least one operational parameter, each of the plurality of service-state messages and the operational parameter being capable of being used by the service-state monitor to determine whether the network connectable device is operative;
send to the service-state monitor via a network connection the registration message; and
send to the service-state monitor via the network connection the plurality of service-state messages, in accordance with the at least one operation parameter for the service-monitoring protocol.

2. A network connectable device defined by claim 1 wherein the service-monitoring protocol information is indicative of at least one of the temporal spacing of the plurality of service-state messages and a plurality of information fields common to each of the plurality of service-state messages.

3. A network connectable device defined by claim 1 comprising memory loaded with information for establishing the network location of the service-state monitor.

4. A network connectable device defined by claim 3 wherein the memory is loaded with network location information indicative of the network location for the service-state monitor.

5. A network connectable device defined by claim 4 wherein the memory is preloaded with the network location information.

6. A network connectable device defined by claim 5 wherein the memory is loaded with the network location information at least one of the following:
during manufacture of the network connectable device;
during commissioning of the network connectable device; and
at the time the network connectable device is connected to the network for sending the plurality of service-state messages.

7. A network connectable device defined by claim 3 wherein the network location information comprises at least one of a network protocol address, a MAC address, and an electronic serial number.

8. A network connectable device defined by claim 3 configured to generate the registration message comprising the service-monitoring protocol information from information loaded in the memory.

9. A network connectable device defined by claim 1 wherein the registration message comprises at least one of identification information indicative of the identification of the network connectable device and network connectable device type information indicative of the network connectable device type.

10. A network connectable device defined by claim 9 wherein the identification information for the network connectable device comprises an identifier uniquely identifying the network connectable device to the service-state monitor.

11. A network connectable device defined by claim 10 wherein the identifier comprises at least one of a MAC address, an electronic serial number and a network protocol address.

12. A network connectable device defined by claim 1 wherein the registration message comprises service-monitoring protocol interruption reporting instructions.

13. A network connectable device defined by claim 1 configured to send to the service-state monitor via the network connection the registration message when at least one of a network connection is established and the network connectable device is initialized.

14. A network connectable device defined by claim 1 configured to send to the service-state monitor via the network connection the registration message when at least one of the network connectable device is reconfigured, the network connection performance changes, a network connectable device configuration changes, and a network connectable device characteristic changes.

15. A network connectable device defined by claim 1 wherein the service-monitoring protocol information defines the service-monitoring protocol.

16. A network connectable device defined by claim 15 wherein the service-monitoring protocol information comprises service-monitoring protocol program instructions defining at least some of the service-monitoring protocol for execution by the service-state monitor.

17. A network connectable device defined by claim 1 configured to send to another service-state monitor other service-state monitoring information defining at least one operational parameter of another service-monitoring protocol that comprises sending another plurality of service-state messages to the other service-state monitor, and sending to the other service-state monitor via the network connection the other plurality of service-state messages.

18. A network connectable device defined by claim 17 configured to, if no response is received from the service-state monitor, send to the other service-state monitor the other service-monitoring protocol information.

19. A method for monitoring a service-state of a network connected device, the method comprising the steps of:
  generating a registration message comprising service-monitoring protocol information for use by a service-state monitor, the service-monitoring protocol information defining at least one operational parameter of a service-monitoring protocol operable to determine a service state of the network connectable device, the service monitoring protocol comprising sending to the service-state monitor a plurality of service-state messages in accordance with the at least one operational parameter, each of the plurality of service-state messages and the operational parameter being capable of being used by the service-state monitor to determine whether the network connectable device is operative;
  sending to the service-state monitor via a network connection the registration messages; and
  sending to the service-state monitor via the network connection the plurality of service-state messages, in accordance with the at least one operational parameter for the service-monitoring protocol.

* * * * *

UNITED STATES PATENT AND TRADEMARK OFFICE
CERTIFICATE OF CORRECTION

PATENT NO. : 11,115,303 B2
APPLICATION NO. : 16/302549
DATED : September 7, 2021
INVENTOR(S) : Geoffrey Sizer and Jonathan Eggins It is certified that error appears in the above-identified patent and that said Letters Patent is hereby corrected as shown below:

In the Specification

In Column 2, Line 30, delete "at at" and insert -- at --, therefor.

In Column 3, Line 66, delete "at at" and insert -- at --, therefor.

In Column 9, under "TABLE 1-continued", Line 27, delete "Regitration" and insert -- Registration --, therefor.

In Column 11, Line 14, delete "at at" and insert -- at --, therefor.

In Column 15, under "TABLE 3-continued", Line 24, delete "Regitration" and insert -- Registration --, therefor.

In Column 19, Line 9, delete "a" and insert -- an --, therefor.

In Column 21, Lines 42-43, delete "intercommunication" and insert -- intercommunication. --, therefor.

In Column 21, Line 46, delete "etc." and insert -- etc., --, therefor.

In Column 24, Line 26, delete "Regitration" and insert -- Registration --, therefor.

Signed and Sealed this
Twenty-first Day of December, 2021

Drew Hirshfeld
*Performing the Functions and Duties of the
Under Secretary of Commerce for Intellectual Property and
Director of the United States Patent and Trademark Office*